May 6, 1941.  E. L. DRYER  2,240,765
DEVICE FOR GROOVING PREFORMED SHEETS
Filed June 28, 1939
Fig 1
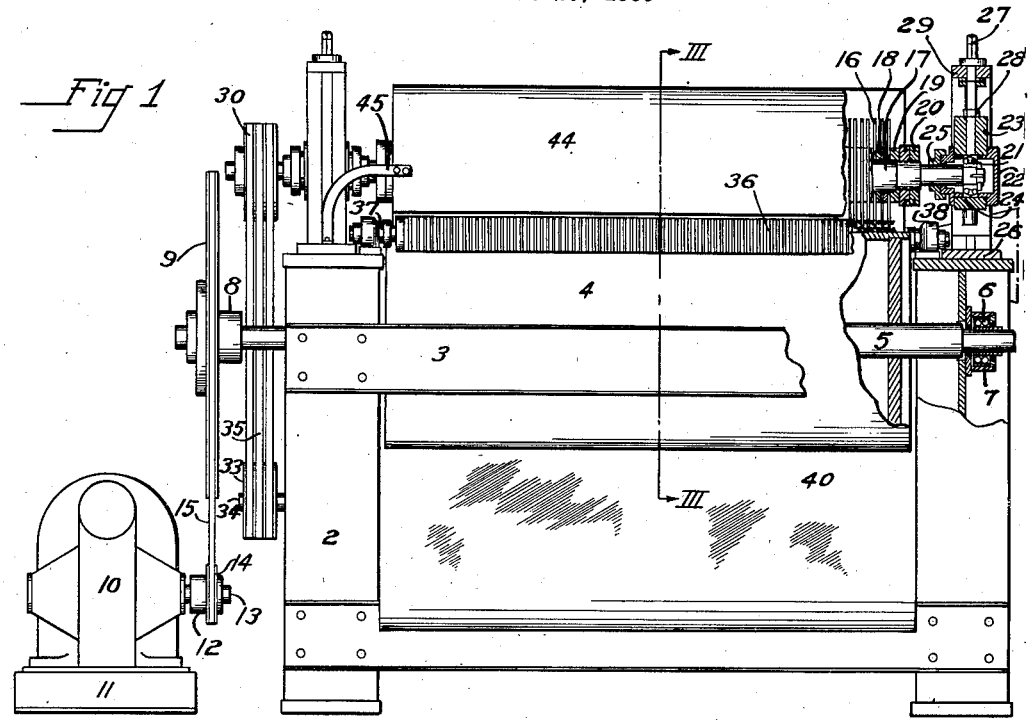
Fig 2
Fig 3
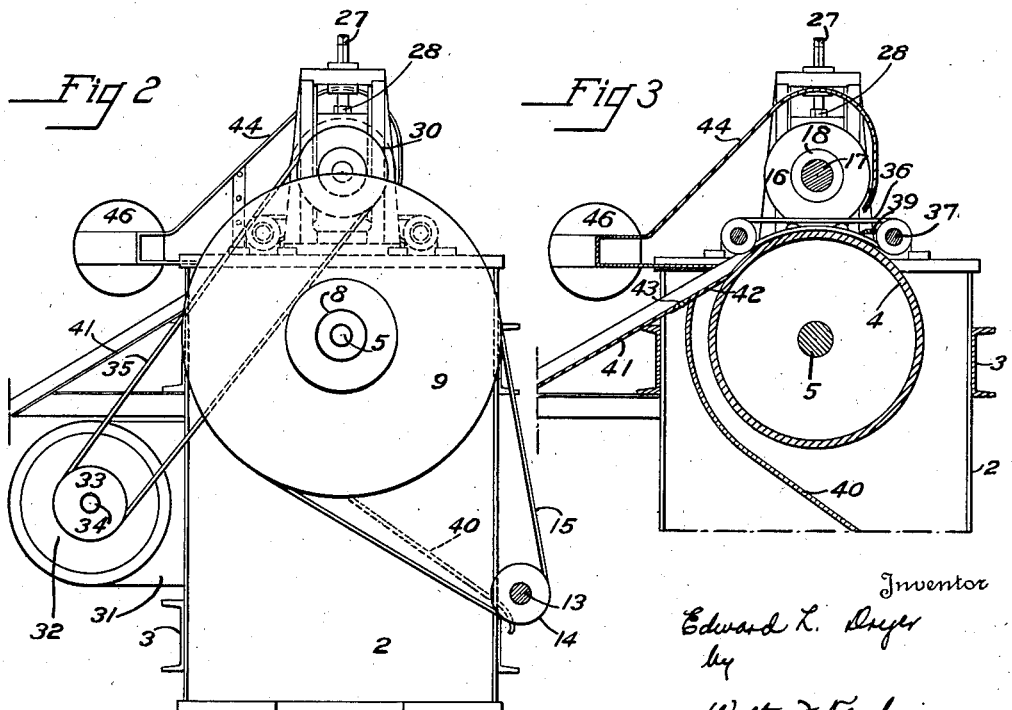
Inventor
Edward L. Dryer
by
Walter F. Kaufman
Attorney Patented May 6, 1941

2,240,765

UNITED STATES PATENT OFFICE 2,240,765

DEVICE FOR GROOVING PREFORMED SHEETS

Edward L. Dryer, Lancaster, Pa., assignor to Armstrong Cork Company, Lancaster, Pa., a corporation of Pennsylvania Application June 28, 1939, Serial No. 281,728

16 Claims. (Cl. 90—11)

This invention relates to devices for grooving preformed sheets or webs, and, more particularly, to a device for forming grooves in preformed, resilient, compressible sheets susceptible to compression or tension during the grooving operation, such as sheets formed of cork, rubber, cork and rubber, synthetic rubber or sponge rubber, composition. By the term "grooves" as used herein, I intend to include grooves, slots, incisions, scores, or the like, having any desired geometrical configuration.

Heretofore, it was considered extremely difficult, if not impossible, to accurately form grooves in resilient, compressible sheet material, such as cork and rubber, or cork and sponge rubber, composition. The resilient, compressible material, being susceptible to compressive and tensile forces was distorted and torn during the grooving operation, so that it was well-nigh impossible to form a plurality of grooves therein of desired shape. Since materials including cork are highly frictional, as well as resilient or compressible, it was found that material being carried forward by a feed drum tended to adhere to some extent to the drum, thus permitting the distortion of the upper surface of such material and causing it to bank or pile up in front of the grooving means, thereby preventing the formation of accurately shaped grooves having a predetermined geometrical configuration.

The chief object of this invention is to provide an economical, rapid and efficient device to form grooves in a preformed sheet. An object of my invention is to provide a grooving device adapted to form a plurality of shaped grooves in a preformed, resilient sheet susceptible to compression or distortion during the grooving operation, such grooves being formed accurately and rapidly. A further object is to provide a grooving device adapted to form grooves in resilient, compressible material, in which distortion and tearing of such material during groove formation is obviated. A still further object is to provide a device adapted to form grooves in a preformed sheet, in which the grooving means is adjustable to form grooves having a predetermined depth. A still further object is to provide a grooving device including means for holding sheets taut during their passage through the grooving device, thus eliminating distortion and permitting grooves of desired configuration to be formed. A still further object is to provide a grooving device including means adapted to feed sheets through the grooving device, such means serving in conjunction with a chute to return grooved sheets to the operator or to remove such sheets from the device as desired.

This invention relates to a grooving device for forming grooves in a preformed sheet, preferably, a resilient, compressible sheet of cork and rubber, or cork and sponge rubber, composition. A plurality of similar, circular saws are adjustably mounted upon a frame, such saws being adapted to form grooves in a preformed sheet. The saws are movable toward and from a feed drum or roll in order to form grooves having a predetermined depth. The feed drum feeds sheets through the saws and likewise serves as a platen against which the grooves are formed.

A sheet tensioning element holds sheets taut and securely against the feed drum during their passage through the saws. A held sheet thus lies on the circumference of the feed drum in convex form during its passage through the saws; since the cutting surfaces of the saws extend in the opposite direction, only line contact is effected between the saws and the supported sheet, which aids materially in accurate, sharp groove formation. The sheet tensioning element may comprise a plurality of V-belts mounted in series with the saws so that their paths of travel extend between adjacent saws and laterally of the feed drum. Thus, a belt is provided on each side of each saw, the series of belts bearing against a fed sheet and holding such sheet taut to prevent distortion or tearing thereof during the grooving operation, and also serves to hold the sheet securely against the feed drum during its passage through the saws, insuring steady, constant feed of the sheet to the saws, and rapid removal thereof after the grooving operation. A guide is provided for the belts which maintains the belts accurately centered as they pass between adjacent saws. If desired, of course, other means may be substituted for the series of belts.

Chutes are mounted on the frame of the device, one chute extending from the vicinity of the saws, around the feed drum to the front of the machine and being adapted to return a grooved sheet to the front of the machine where it may be readily grasped by the operator, the second chute extending from the vicinity of the saws to the rear of the machine and being adapted to remove a grooved sheet from the machine since it extends downwardly at an angle sufficiently great to permit a grooved sheet to slide downwardly to the rear of the machine where the sheets may be stacked either manually or by any suitable stacking device. A hinged chute section is attached to and connects such chutes being adapted, when in normal position, to close one of such chutes. Such hinged chute section is movable to determine the path of travel of a grooved sheet; in other words, it may be actuated by any suitable means to close either chute, thus assuring travel of a grooved sheet into and along the other chute. Preferably, such hinged chute section, when in normal position, serves to close the return chute, thus permitting a grooved sheet to be ejected from the device.

I will describe the operation of my device as used for forming a plurality of grooves longitudinally and laterally of the sheet, thus breaking up the surface of the sheet into a plurality of squares or blocks of any desired size as determined by the spacing of the saws. It will be understood, of course, the device may be used satisfactorily to form a plurality of grooves longitudinally or laterally of a sheet. The saws and the feed drum are actuated at constant speeds having a predetermined ratio to one another in order to insure most satisfactory operation of the device. A preformed sheet, or web, if desired, is placed on the feed drum and is carried by the drum to and through the saws, thereby forming a plurality of shaped grooves in the sheet. The sheet, during its passage through the saws, is held taut by the series of belts placed in spaced relationship to the saws, permitting speedy and accurate groove formation, and is likewise held securely against the feed drum thereby insuring steady, constant movement of the sheet through the saws and permitting line contact only between the sheet and the saws. The hinged chute section is placed to feed the grooved sheet into the return chute which, in conjunction with the feed drum, returns the grooved sheet to the front of the device where it may be readily grasped by the operator. The sheet now possesses a plurality of longitudinal, accurately formed grooves.

The operator raises the sheet, turns it through an angle of 90° and again places it on the feed drum. The feed drum carries the sheet through the saws a second time thereby forming a plurality of accurately shaped grooves laterally of the sheet. The surface of the sheet, accordingly, is broken up into a plurality of squares or blocks of any desired size as determined by the spacing of the saws. The hinged chute section is then moved to its normal position, closing the return chute and opening the removal chute, thereby permitting the sheet to slide down the removal chute to the rear of the machine where it may be stacked, as discussed above.

The attached drawing illustrates a preferred embodiment of my invention, in which—

Figure 1 is a front elevation of the grooving device, partially broken away to illustrate the saw adjusting mechanism;

Figure 2 is a side elevation of the device shown in Figure 1; and

Figure 3 is a sectional view of the device shown in Figure 1, taken along the line III—III thereof.

Referring to the drawing, there is shown a frame consisting of frame plates 2 joined by braces or angle irons 3 bolted thereto and serving to re-enforce and strengthen the frame. A hollow steel drum or feed roll 4 is mounted upon a shaft 5, the shaft 5 being journalled on opposite sides of the frame and resting on bearings 6 held in bearing housings 7. The drum 4 may be of any suitable diameter and, in my preferred embodiment, is approximately sixteen inches in diameter. On one end of the shaft 5 is keyed a hub 8 upon which is mounted a sprocket 9. The feed drum 4 is actuated by a suitable motor 10 mounted upon a motor base 11 adjacent the device. A hub 12 is keyed to the shaft 13 of the motor 10 and carries a sprocket 14, the sprocket 14 and the sprocket 9 being connected by a roller chain 15. I have found that a one and one-half H. P. right angle motor (1725 to 13.9 R. P. M.) may be used satisfactorily to rotate the drum at any desired speed, approximately ten feet per minute (roughly 2.38 revolutions per minute) being satisfactory for my purposes.

Grooving means are provided adjacent the feed drum 4, such means consisting of a series of similar circular saws 16 mounted on a mandrel 17. Any desired number of saws 16, may, of course, be used. The saws 16 are separated by spacers or washers 18 of desired thickness, the spacers 18 and saws 16 being locked on the mandrel 17 by end spacers 19 and check nuts 20. The mandrel 17 is journalled on opposite sides of the frame in adjusting mechanism (best illustrated in Figure 1) permitting the saws 16 to be moved in a vertical direction toward and from the feed drum 4 thereby providing for a predetermined depth of the grooves, to be formed by such saws. The mandrel 17 rests on bearings 21 secured as a unit by a housing 22 and a cover 23. Oil seals 24 are provided to seal the bearing unit. Bearing flinger 25 serves to prevent penetration of dust in the bearing unit. Brackets 26, bolted to the frame, serve to carry the bearing unit and the adjusting mechanism. An adjusting screw 27 is carried by the brackets 26 and a check nut 28 serves in conjunction with the adjusting screw 27 to hold the adjusting mechanism in fixed position. A bracket cap 29 is mounted on the brackets 26 and serves to close the mechanism. Similar means are provided on the opposite end of the mandrel 17. When it is desired to raise or lower the mandrel 17 and the saws 16 carried thereby, the check nuts 28 are loosened, the mandrel 17 raised or lowered as desired on the adjusting screws 27 and the check nuts 28 again tightened. It will be observed, I provide a simple, economical and efficient means for adjusting the saws thus obviating the disadvantages arising from the use of complex, complicated mechanism.

On one end of the mandrel 17 is secured a pulley 30. On the rear of the device is placed a motor base 31 carrying a motor 32. A pulley 33 is secured on the shaft 34 of the motor 32 and is connected by belts 35 to the mandrel pulley 30. Preferably, the motor 32 is adapted to rotate at 1200 R. P. M. The saws 16 are adapted to rotate in unison at a speed of approximately 2500 feet per minute (1000 R. P. M.). The motors 10 and 32 are connected to any suitable source of power and are adapted to be actuated by switches (not shown).

An important feature of my invention resides in the sheet tensioning element which serves to hold a sheet taut and securely against the drum 4 during its passage through the saws 16. It will be appreciated a held sheet lies on the circumference of the feed drum in convex form during its passage through the saws 16; since the cutting surfaces of the saws extend in the opposite direction, only line contact is effected between the saws and the supported sheet. The sheet tensioning element comprises a series of V-belts 36 mounted in spaced relationship to one another. Such belts 36 are mounted in series with the saws 16, so that their paths of travel extend between adjacent saws and laterally of the feed drum 4, providing a belt on each side of each saw 16, the series of belts bearing against a fed sheet and holding such sheet taut to prevent distortion or tearing during the grooving operation, and also serving to hold such sheet securely against the feed drum 4 during its passage through the saws 16, insuring constant feed of sheets to the saws 16 and rapid removal of such sheets after the grooving operation. Preferably, the belts 36 are more numerous than the saws 16 so that each saw is placed between belts thus insuring the fed sheet against distortion and tearing during the grooving operation. The belts 36 are mounted on mandrels 37 journalled in pillow boxes 38 mounted on opposite sides of the frame, such pillow boxes being adjustable to aid in maintaining the belts 36 secure and taut. A belt guide 39 extends longitudinally of the drum 4 and is bolted to the frame, such guide 39 being tapered or beveled at one end, which end is provided with notches through which the belts 36 pass and which serve to accurately align the belts as they pass through the saws 16. The guide 39 is formed of micarta, Bakelite, wood, or similar material, in order that it will not injure the saws 16 if, accidentally, it comes in contact therewith. It will be understood any suitable form of belt guide may be substituted in place of the guide above described. The mandrels 37 are positioned on the frame 2 adjacent to the saws 16, one mandrel 37 being placed in front of the saws 16, the other mandrel 37 being positioned rearwardly thereof.

A return chute 40 is provided to return a grooved sheet to the front of the device where it may be readily grasped by the operator. Such chute 40 extends from the vicinity of the saws 16 around the feed drum 4 to the front of the device. A removal chute 41 is provided, extending from the vicinity of the saws downwardly, and is adapted to remove a grooved sheet from the device so that it may be stacked manually, or by any suitable stacking device. The chutes 40 and 41 are connected by a hinged section 42, hinged as at 43 (best shown in Figure 3). Such hinged section 42, when in normal position, serves to close the return chute 40, thus permitting the grooved sheet to be removed from the device and it is actuated by suitable means (not shown) to close the chute 41 and open the chute 40, thus returning the grooved sheet to the front of the device where it may be grasped readily by the operator.

A hood 44 encloses the saws 16 and is supported by brackets 45 bolted to the frame. The hood 44 leads to a duct 46. Any suitable type of blower may be utilized to remove dust, created in the grooving operation, from the hood 44 through the exhaust duct 46.

In operation, the motors 10 and 32 are actuated, thus rotating the saws 16 and the feed drum 4 at constant speeds having a predetermined ratio to one another. The operator places a sheet of composition material on the feed drum 4, the sheet being carried forward to the saws 16 by the drum 4 and the belts 36. The sheets are thus carried through the saws 16, which form a plurality of longitudinal grooves having a predetermined geometrical configuration. Since the hinged chute section 42 in normal position closes the entrance to the return chute 40, the grooved sheet is permitted to slide down the chute 41 to the rear of the device where it may be stacked with similar sheets. All the time the saws are in operation, the blower withdraws the dust created by the grooving operation.

In many cases, it is desirable that a composition sheet be grooved laterally as well as longitudinally. I will describe the operation of the device with respect to such specific type of groove formation. A sheet is fed through the saws 16 as above described. The hinged chute section 42, being actuated by suitable means to open the return chute 40 and to close the removal chute 41, permits the grooved sheet to enter the chute 40, which serves, in conjunction with the feed drum 4, to return such sheet to the front of the device where it may be grasped by the operator. The sheet is then, of course, grooved longitudinally. The operator turns the longitudinally grooved sheets at an angle of 90° to the direction of the grooves and places it on the feed drum 4 which feeds the sheet through the saws 16 as above described, thus grooving the sheet laterally as well as longitudinally. The hinged chute section 42 is then restored to normal position, closing the return chute 40 and opening the removal chute 41, which permits the longitudinally and laterally grooved sheet to slide down the chute 40 to the rear of the device.

It will be observed that my device performs efficiently, rapidly, and satisfactorily in the formation of grooves in preformed sheets, even sheets susceptible to compressive and tensile forces during the grooving formation, and permits groove formation without distortion or tearing of the sheets. Unskilled labor may be used to efficiently and satisfactorily carry on the grooving operation. My device permits steady, effective flow of the material to be grooved and insures accurate groove formation and satisfactory removal of such material from the device. Means are provided to hold a sheet taut during groove formation, thus permitting sharp, regular, uniform grooves to be obtained without distortion or tearing of the sheet. Such means also assist in feeding sheets through the saws by holding sheets securely against the feed drum during the grooving operation. The grooving means may be adjusted for any desired depth of groove, or to cut the material into strips, if desired.

While I have described and illustrated a preferred embodiment of my invention, it will be understood my invention is not so limited since it may be otherwise embodied within the scope of the following claims.

I claim:

1. In a grooving device for forming grooves in a resilient, preformed sheet, a frame, a plurality of saws mounted on said frame in spaced relationship to one another, a feed drum, said saws being movable toward and from said drum to form grooves having a predetermined depth, and a plurality of belts serving to hold a sheet in engagement with said drum during its passage through said saws, said belts being mounted on said frame in series with said saws.

2. In a grooving device for forming grooves in a resilient, preformed sheet, a frame, a plurality of saws mounted on said frame in spaced relationship to one another, a feed drum, said saws being movable toward and from said drum to form grooves having a predetermined depth, a plurality of belts serving to hold a sheet in engagement with said drum during its passage through said saws thereby permitting line contact only between said saws and the held sheet, said belts being mounted on said frame in series with said saws, and a belt guide serving to align said belts.

3. A grooving device for forming grooves in a resilient, preformed sheet of cork and rubber composition comprising a frame, a plurality of circular saws adjustably mounted on said frame in spaced relationship to one another, means for actuating said saws, a feed drum adapted to pass sheets through said saws, means for rotating said drum at a predetermined speed of rotation, and a plurality of similar belts adapted to hold a sheet in engagement with said drum during its passage through said saws, said belts being mounted on said frame in series with said saws.

4. A grooving device comprising a frame, a plurality of circular saws mounted on said frame in spaced relationship to one another, a feed drum, said saws being movable toward and from said feed drum, means for actuating said saws, similar means for actuating said feed drum, and a plurality of belts mounted on said frame in spaced relationship to one another, said belts being mounted in series with said saws and serving to hold sheets against said drum during passage through said saws, a chute mounted on said frame adjacent said drum and serving in conjunction with said drum to return a grooved sheet to the operator, a second chute mounted on said frame serving to remove the grooved sheet from the device, and a hinged chute section attached to said chutes and serving, when in normal position, to close one of such chutes.

5. A grooving device comprising a frame, a plurality of circular saws mounted on said frame in spaced relationship to one another, a feed drum, said saws being movable toward and from said drum, means for actuating said saws, similar means for actuating said drum, and a plurality of belts mounted on said frame in spaced relationship to one another, said belts being mounted in series with said saws and serving to hold sheets against said drum during passage through said saws, a chute mounted on said frame adjacent said drum and serving in conjunction with said drum to return a grooved sheet to the operator, a second chute mounted on said frame serving to remove the grooved sheet from the device, a hinged chute section attached to said chutes and serving, when in position, to close one of such chutes, a hood enclosing said saws, an exhaust duct connected to said hood, and means for removing dust from said hood through said duct.

6. In a grooving device, means for forming a plurality of grooves in a preformed sheet, said means being adjustable so as to form grooves having a predetermined depth, feeding means adapted to pass sheets through said grooving means, a plurality of sheet tensioning elements adapted to hold a sheet in engagement with said feeding means during its passage through said grooving means, at least some of said elements being disposed in alternate relationship with said grooving means, and a guide serving to align said sheet tensioning elements with one another.

7. In a grooving device, means for forming a plurality of grooves in a preformed sheet, means for feeding sheets through said grooving means, a plurality of belts placed in spaced relationship to one another and in alternate relationship with said grooving means adapted to hold sheets taut during passage through said grooving means, and means for holding said belts in alignment with one another.

8. In a grooving device, means for forming a plurality of grooves in a preformed sheet, a feed drum for feeding sheets through said means, and a plurality of sheet tensioning elements disposed in alternate relationship with said means adapted to hold sheets taut during passage through said means.

9. In a grooving device, means for forming a plurality of grooves in a preformed sheet, a platen, means for feeding sheets through said grooving means, and a plurality of sheet tensioning elements disposed in alternate relationship with said grooving means adapted to hold sheets taut during passage through said groove forming means.

10. In a grooving device, means for forming a plurality of grooves in a preformed sheet, a feed drum for feeding sheets through said means, said means being placed in spaced relationship to said feed drum and being movable toward and from said drum to form grooves of predetermined depth, and a plurality of sheet tensioning elements maintaining a sheet in position against said drum during its passage through said means so that line contact only is effected between the grooving means and the positioned sheet, at least some of said elements being disposed in alternate relationship with said grooving means.

11. In a grooving device, means for forming a plurality of grooves in a preformed sheet, said means being adjustable so as to form grooves having a predetermined depth, feeding means adapted to pass sheets through said grooving means and being positioned in spaced relationship thereto, and a plurality of sheet tensioning elements adapted to hold a sheet in engagement with said feeding means during its passage through said grooving means, said sheet tensioning elements being disposed in alternate relationship with said grooving means.

12. A grooving device according to claim 11, in which said sheet tensioning elements comprise a series of belts, placed in spaced relationship to one another.

13. A grooving device according to claim 11, in which said grooving means comprises a series of similar saws positioned in spaced relationship to one another and movable toward and from the feed drum.

14. A grooving device for forming grooves in a resilient, preformed sheet of cork and rubber composition comprising a frame, a plurality of similar saws adjustably mounted on said frame in spaced relationship to one another, means for actuating said saws, a feed drum adapted to pass sheets through said saws, means for rotating said drum at a predetermined speed of rotation, and a plurality of sheet tensioning elements mounted on said frame in spaced relationship to said saws adapted to hold sheets against said drum during passage through said saws thereby permitting line contact only between said saws and held sheets, at least some of said elements being mounted on said frame in alternate relationship with said saws.

15. In a grooving device for forming a plurality of grooves in a preformed sheet, a frame, a plurality of saws mounted on said frame in spaced relationship to one another, a feed drum supported by said frame, the axis of said drum extending in a parallel direction to the axes of said saws, means to actuate said drum, and a plurality of belts serving to hold a sheet in engagement with said drum during its passage through said saws, said belts being flexed over a portion of the periphery of said drum, and being mounted on said frame in alternate relationship with said saws.

16. In a grooving device, a plurality of saws adapted to form grooves in a preformed sheet, feeding means adapted to pass sheets through said saws and being positioned in spaced relationship thereto, and a plurality of sheet tensioning elements adapted to hold a sheet in engagement with said feeding means during its passage through said saws, said sheet tensioning elements being disposed at least between adjacent pairs of saws.

EDWARD L. DRYER.